United States Patent [19]

Arimoto et al.

[11] 4,321,335

[45] Mar. 23, 1982

[54] POWDER COATING RESIN COMPOSITION

[75] Inventors: Shunji Arimoto, Izumiohtsu; Akio Shoji, Kishiwada; Shoichiro Takezawa, Sakai; Noboru Ishikawa; Hirofumi Takeda, both of Izumiohtsu, all of Japan

[73] Assignee: Dainippon Ink & Chemicals, Inc., Tokyo, Japan

[21] Appl. No.: 158,376

[22] Filed: Jun. 11, 1980

[30] Foreign Application Priority Data

Jun. 19, 1979 [JP] Japan ............................ 54-76346
Sep. 26, 1979 [JP] Japan ........................... 54-122544

[51] Int. Cl.³ ...................... C08L 63/00; C08L 37/00; C08L 75/04
[52] U.S. Cl. ................................... 525/116; 525/124; 525/160; 525/327; 525/934; 526/277
[58] Field of Search ............... 525/116, 124, 160, 934, 525/327; 526/277

[56] References Cited

U.S. PATENT DOCUMENTS

| | | | |
|---|---|---|---|
| 3,576,793 | 4/1971 | Carroll | 525/116 |
| 3,792,113 | 2/1974 | Goswami | 525/160 |
| 3,847,846 | 11/1974 | Asada | 526/277 |
| 3,883,463 | 5/1975 | Jin | 525/160 |
| 3,993,849 | 11/1976 | Victorius | 525/124 |
| 4,091,049 | 5/1978 | Labana | 260/836 |
| 4,177,179 | 12/1979 | Kurihara | 526/277 |

FOREIGN PATENT DOCUMENTS

| | | | |
|---|---|---|---|
| 48-38617 | 11/1973 | Japan . | |
| 49-38122 | 9/1974 | Japan . | |
| 49-117530 | 11/1974 | Japan | 525/124 |

OTHER PUBLICATIONS

Detroit Society for Paint Technology, Powder Coating, J. of Paint Tech., pp. 30–37, vol. 44, No. 565 (1972).

*Primary Examiner*—Paul Lieberman
*Attorney, Agent, or Firm*—Sherman & Shalloway

[57] ABSTRACT

A powder coating resin composition comprising (A) a phosphorus-containing vinyl polymer containing a curable functional group and having a softening point, determined by the ring and ball method, of 70° to 150° C. and a number average molecular weight of 1500 to 30000, and (B) a curing agent.

10 Claims, No Drawings

POWDER COATING RESIN COMPOSITION

This invention relates to a resin composition suitable for preparation of a "powder paint" which gives a coated film having superior surface properties, particularly, superior smoothness, brightness and gloss.

Thermosetting powder paints are solventless, and are among the best non-polluting resource-saving paints. These powder paints, however, suffer from various defects attributed to non-use of solvents. The most serious defect is the poor appearance of a coated film prepared from it. A thermosetting powder coating composition which is slow-curing and has a long fluidization time could give a coated film of good smoothness, but this means such a powder paint cannot meet the basic requirement that paints in general should cure at the lowest possible temperatures within the shortest possible periods of time. Accordingly, the thermosetting powder paints have only limited application in fields which require both a high degree of film surface properties, particularly smoothness in "vertical coating" (coating on a perpendicular surface), and baking at low temperatures within short periods of time.

In an attempt to remove these defects, various investigations have been undertaken about the monomeric composition or molecular weight distribution of vinyl polymers, and resulted in some improved powder paints. It cannot still be denied however that "powder paints" are inferior to solvent-base paints.

Particularly, it has been strongly desired to improve thermosetting powder paints comprising a glycidyl group-containing vinyl copolymer in regard to the dispersibility of pigments therein, but no effective means for achieving the desired improvement has been developed so far.

The present inventors have made extensive investigations in order to remedy the aforesaid defects of thermosetting powder paints. These investigations have led to the surprising discovery that inclusion of phosphorus in a vinyl polymer as a base of a resinous component can bring about an improvement in the smoothness and brightness of a coated film from a powder paint, particularly the smoothness of a coated film formed on a perpendicular surface, and also in the dispersibility of pigments in glycidyl group-containing vinyl copolymers, without impairing the good weatherability, mechanical strength and curability of a coated film of a vinyl resin powder paint.

According to this invention, there is provided a powder coating resin composition comprising (A) a phosphorus-containing vinyl polymer containing a curable functional group and having a softening point of 70° to 150° C. and a number average molecular weight of 1500 to 30000, and (B) a curing agent.

The vinyl polymer (A) used in this invention is firstly required to have a curable functional group. Such curable functional groups include, for example, hydroxyl, carboxyl and glycidyl groups. Introduction of these functional groups into the vinyl polymer can be effected, for example, by copolymerizing a vinyl monomer having a curable functional group with another vinyl monomer. The vinyl monomer having a curable functional group is a curable material for increasing the mechanical strength of a coated film, and denotes a vinyl monomer having a hydroxyl group, a carboxyl group, a glycidyl group, etc.

Typical examples of hydroxyl-containing monomers include 2-hydroxyethyl (meth)acrylate, 2-hydroxypropyl (meth)acrylate, 4-hydroxybutyl (meth)acrylate, polyethylene glycol mono(meth)acrylate, and polypropylene glycol mono(meth)acrylate. Typical examples of carboxyl-containing monomers include (meth)acrylic acid, itaconic acid, maleic acid, fumaric acid and crotonic acid, and typical examples of glycidyl-containing monomers include glycidyl (meth)acrylate, and $\beta$-methylglycidyl (meth)acrylate.

Vinyl polymers having improved and well-balanced paint properties can be prepared by copolymerizing these curable vinyl monomers with other conventional vinyl monomers copolymerizable therewith, such as alkyl (meth)acrylates [e.g., methyl (meth)acrylate, ethyl (meth)acrylate, isopropyl (meth)acrylate, and n-, iso- or tert-butyl (meth)acrylate], dialkyl esters of aliphatic unsaturated dibasic acids [e.g., diethyl fumarate, dibutyl fumarate, dimethyl maleate, dibutyl maleate and dibutyl itaconate], styrene, vinyl-toluene, acrylonitrile and vinyl acetate.

The proportion of the vinyl monomer having a curable functional group in the vinyl polymer is usually 5 to 50% by weight, preferably about 10 to about 30% by weight. If this proportion is less than 5% by weight, the resulting coated film has insufficient mechanical strength, and if its exceeds 50% by weight, the resulting coated film has poor smoothness.

Secondly, the vinyl polymer (A) in this invention is required to contain phosphorus. Phosphorus is effective for improving the appearance of a coated film from the vinyl polymer (A). Introduction of phosphorus into the vinyl polymer may be effected, for example, by using a phosphorus-containing vinyl monomer as a comonomer in the preparation of the vinyl polymer (A), or by adding a phosphorus-containing compound during or after copolymerization of the monomer having a curable functional group with another copolymerizable monomer to react it with the copolymer.

The phosphorus-containing vinyl monomer is used for improving pigment dispersibility and strikingly improving the smoothness, gloss and brightness of the resulting coated film. The suitable amount of the phosphorus-containing vinyl monomer is usually 0.001 to 10% by weight, preferably 0.05 to 2% by weight, based on the polymer (A). If it is less than 0.001% by weight, its effect is poor, and if it exceeds 10% by weight, the smoothness of the resulting coated film is inferior.

Typical examples of the phosphorus-containing vinyl monomer include acid phosphoxy.alkyl (meth)acrylates which are phosphoric acid esters of $\beta$-hydroxyethyl (meth)acrylate, $\beta$-hydroxypropyl (meth)acrylate, $\beta$-hydroxy-$\gamma$-chloropropyl (meth)acrylate, etc.; dialkyl phosphate alkyl(meth)acrylates which are esters between these acid phosphoxy.alkyl(meth)acrylates and alcohols such as ethanol, butanol or ethylene glycol; and dialkyl phosphite alkyl(meth)acrylates such as diethyl phosphite ethyl(meth)acrylates or dibutyl phosphite ethyl(meth)acrylate. Of these, the phosphoric monoester of $\beta$-hydroxyethyl (meth)acrylate and the phosphoric monoester of $\beta$-hydroxypropyl (meth)acrylate are preferred because of their outstanding effect.

As stated hereinabove, phosphorus can be introduced into the polymer (A) also by first copolymerizing the monomer having a curable functional group with another copolymerizable monomer and then adding a phosphorus-containing compound to the polymerization system, instead of using a phosphorus-containing vinyl monomer in the preparation of the vinyl polymer (A). A typical example is a method which comprises reacting phosphoric acid with a vinyl polymer containing glycidyl methacrylate.

Thirdly, the vinyl polymer (A) used in this invention is required to have a softening point (determined by the ring and ball method) of 70° and 150° C. and a number average molecular weight of 1500 to 30000. Polymers which meet this requirement can be easily produced by using suitable proportions of the various monomers or phosphorus-containing compounds described above, and polymerizing them by a known methods such as solution polymerization, bulk polymerization or suspension polymerization.

The curing agent (B) to be incorporated in the polymer (A) in the composition of this invention may, for example, be an amino resin such as hexamethoxymethyl melamine, or a blocked polyisocyanate obtained by blocking an adduct of a polyisocyanate such as isophorone diisocyanate or xylylene diisocyanate and a polyhydric alcohol such as ethylene glycol with a conventional blocking agent such as an alcohol or caprolactam, when the vinyl polymer (A) contains a hydroxyl group as the functional group. An epoxy resin, such as a bisphenol-type epoxy resin, triglycidyl isocyanurate or a diglycidyl ether ester of p-hydroxybenzoic acid, is a typical example of the curing agent (B) when the functional group in the polymer (A) is a carboxyl group. Furthermore, when the functional group in the polymer (A) is a glycidyl group, polycarboxylic acids are suitably used as the curing agent (B). Preferred polycarboxylic acids are $C_4$–$C_{20}$ saturated aliphatic dicarboxylic acids, such as adipic acid, pimelic acid, suberic acid, azelaic acid, sebacic acid and decanedicarboxylic acid.

The suitable proportion of the curing agent (B) used is usually 3 to 30% by weight, preferably 5 to 20% by weight, based on the total amount of the curing agent (B) and the polymer (A).

The composition of this invention may, if desired, contain various amines or acids as catalysts (curing promoters) for promoting the curing reaction, polymers of long-chain alkyl esters of acrylic acid, as agents fluorine compounds or silicon compounds for preventing crater formation in coated films or improving their smoothness, etc. Epoxy resins may also be incorporated in order to improve adhesion.

A powder paint can be prepared from the composition of this invention by any of known methods.

A coated film having superior properties can be obtained by coating the powder paint by a known methods such as electrostatic spraying or fluidization dipping method and baking the coating.

By using the powder paint prepared from the composition of this invention, the smoothness and brightness of the resulting coated film, especially the smoothness of the coating obtained by "vertical coating," can be excellently improved. In addition, the basic characteristics of vinyl-type powder paints in general, i.e. the superior weatherability, mechanical strength and curability of the coated films, can be retained. In particular, a powder paint obtained by a vinyl polymer (A) having a glycidyl group as a curable functional group has markedly improved pigment dispersibility.

The following Examples and Comparative Examples illustrate the present invention specifically. All parts in these examples are by weight.

EXAMPLE 1

Styrene (40 parts), 25 parts of methyl methacrylate, 20 parts of dibutyl fumarate, 14.9 parts of 2-hydroxyethyl methacrylate, 0.1 part of acid phosphoxy.ethyl methacrylate, 4 parts of azobisisobutyronitrile and 1 part of benzoyl peroxide were added dropwise over the course of 4 hours to a mixture of 70 parts of toluene and 30 parts of n-butanol heated at 100° C. The reaction was continued further for 10 hours. The reaction product was distilled at 200° C. and 1 mmHg until the solvents no longer distilled out. Thus, a solid vinyl polymer was obtained which had a softening point of 114° C. and a molecular weight of 6000.

Then, 90 parts of the vinyl polymer was mixed with 10 parts of hexamethoxymethyl melamine, 30 parts of titanium oxide and 1 part of "Modaflow" (a flowability regulator, a tradename for a product of Monsanto Company). The mixture was melt-kneaded and extruded by an extruder. The extrudate was finely pulverized and those particles which passed through a 200-mesh wire screen were collected as a powder paint.

The powder paint was coated on an iron phosphate-treated steel sheet by electrostatic spraying, and then baked at 180° C. for 20 minutes.

EXAMPLE 2

The same procedure as in Example 1 was repeated except that 40 parts of styrene, 15 parts of dimethyl maleate, 25 parts of n-butyl methacrylate, 19.9 parts of 2-hydroxypropyl methacrylate and 0.1 part of 3-chloro-2-acid phosphoxy propyl methacrylate were used. A vinyl polymer having a softening point of 110° C. and a molecular weight of 6500 was obtained. Using the resulting vinyl polymer, a coated film was prepared in the same way as in Example 1.

EXAMPLE 3

The same procedure as in Example 1 was repeated except that 25 parts of styrene, 15 parts of methyl methacrylate, 45 parts of isobutyl methacrylate, 14.95 parts of 2-hydroxyethyl methacrylate and 0.05 part of diethyl phosphate.ethyl methacrylate were used. A vinyl polymer having a softening point of 116° C. and a molecular weight of 7000 was obtained.

Then, 85 parts of the vinyl polymer was mixed with 15 parts of "Crelan" (a tradename for a blocked isocyanate made by Bayer AG), 50 parts of titanium oxide, 1 part of "Modaflow" (tradename) and 1 part of dibutyltin oxide, and the same operation as in Example 1 was repeated to obtain a powder paint.

The powder paint was coated on an iron phosphate-treated steel sheet by electrostatic spraying, and baked at 200° C. for 20 minutes.

EXAMPLE 4

Forty parts of n-butyl methacrylate, 20 parts of cyclohexyl methacrylate, 24.8 parts of styrene, 15 parts of methacrylic acid, 0.2 part of diethyl phosphite.ethyl acrylate, 3 parts of azobisisobutyronitrile and 0.5 part of cumene hydroperoxide were added dropwise over the course of 4 hours to 100 parts of xylene at 120° C., and the reaction was further continued for 10 hours. The reaction product was distilled at 200° C. and 1 mmHg to remove the solvent, thereby forming a solid vinyl polymer having a softening point of 116° C. and a molecular weight of 5500.

Then, 90 parts of the vinyl polymer was mixed with 10 parts of glycidyl p-hydroxybenzoate, 30 parts of titanium oxide and 1 part of "Modaflow" (tradename), and using the resulting composition, a coated film was obtained in the same way as in Example 1.

EXAMPLE 5

The same procedure as in Example 4 was repeated except that 30 parts of styrene, 20 parts of dibutyl maleate, 20 parts of methyl methacrylate, 15 parts of glycidyl methacrylate, 14.5 parts of β-methylglycidyl methacrylate and 0.5 part of diethyl phosphate.ethyl acrylate were used. Thus, a vinyl polymer having a softening point of 108° C. and a molecular weight of 5000 was obtained.

Then, 85 parts of the vinyl polymer was mixed with 15 parts of decanedicarboxylic acid, 25 parts of titanium dioxide and 1 part of "Modaflow" (tradename), and using the resulting composition, a coated film was obtained in the same way as in Example 1.

EXAMPLE 6

A vinyl polymer having a softening point of 108° C. and a molecular weight of 5000 was prepared in the same way as in Example 5 except that dibutyl phosphite.ethyl methacrylate was used instead of the diethyl phosphate.ethyl acrylate.

Using the resulting vinyl polymer, a coated film was obtained in the same way as in Example 5.

EXAMPLE 7

A vinyl polymer havng a softening point of 108° C. and a molecular weight of 5000 was prepared in the same way as in Example 5 except that phosphoric acid was used instead of the diethyl phosphate.ethyl acrylate, and added batchwise in five portions during the dropwise addition of the monomers.

Using the resulting vinyl polymer, a coated film was prepared in the same way as in Example 5.

Comparative Example 1

The procedure of Example 1 was repeated except that the acid phosphoxy.ethyl methacrylate was not used.

Comparative Example 2

The same procedure as in Example 7 was repeated except that phosphoric acid was not charged at the time of polymerization, but added at the time of adding "Modaflow."

Test Example

The properties of the coated films obtained in the foregoing examples were tested, and the results are shown in Table 1.

TABLE 1

| Coated films | Example | | | | | | | Comparative Example | |
|---|---|---|---|---|---|---|---|---|---|
|  | 1 | 2 | 3 | 4 | 5 | 6 | 7 | 1 | 2 |
| Smoothness A | ◎ | ○ | ◎ | ○ | ○ | ◎ | ◎ |  | Δ |
| Smoothness B |  |  |  | ◎ |  |  |  |  | ○ |
| Gloss (60° reflection angle) (%) | 94 | 94 | 98 | 94 | 96 | 94 | 92 | 91 |  |
| Brightness |  |  | ◎ |  |  |  |  |  | ○ |

TABLE 1-continued

| Coated films | Example | Comparative Example |
|---|---|---|
|  | 1 2 3 4 5 6 7 | 1 2 |
| Erichsen (mm) | >7 | >7 |
| Impact resistance (500 g × cm) | >30 | >30 |
| Weatherability (%) | >80 | >80 |

The properties shown in Table 1 were determined as follows:

Smoothness A

Determined visually on a sample having a film thickness of 40 microns obtained by baking a coated sheet in the perpendicularly erect state.

Smoothness B

Determined visually on a sample having a film thickness of 60 microns obtained by baking a coated sheet in the horizontally laid state.

Weatherability

The same type of sample as used in determining smoothness B was used, and the weatherability of the sample was expressed in terms of the percent retention of gloss after exposure for 500 hours.

Brightness

The same type of sample as used in determining smoothness B was used, and the vividness of the sample was visually determined.

The smoothness and vividness were rated on a scale of four grades as follows:

| ◎: | Excellent |
|---|---|
| ○: | Very good |
| Δ: | Good |
| X: | Poor |

EXAMPLES 8 TO 10 AND COMPARATIVE EXAMPLE 3

One hundred parts of each of the monomeric mixtures shown in Table 2 and 4 parts of azobisisobutyronitrile were added dropwise over the course of 4 hours to 100 parts of toluene heated at 100° C., and the reaction was further performed for 6 hours. The reaction product was distilled at 200° C. and 1 mmHg until the solvent no longer distilled out. Thus, vinyl polymers having the softening points and molecular weights shown in Table 2 were obtained.

Then, 35 parts of each of these vinyl polymer was mixed with 15 parts of dodecanedioic acid, 25 parts of titanium dioxide and 1 part of "Modaflow" (tradename). The mixture was melt-kneaded and extruded at 100° C. by an extruder. The extrudate was finely pulverized and those particles which passed through a 200-mesh wire screen were collected as a powder paint.

The powder paint was coated on a zinc phosphate-treated steel sheet by electrostatic spraying, and baked at 180° C. for 20 minutes.

The properties of the coated film were determined, and the results are shown in Table 3.

TABLE 2

| | | Example 8 | Example 9 | Example 10 | Comparative Example 3 |
|---|---|---|---|---|---|
| Monomer proportions (parts) | Styrene | 34.5 | 34 | 15 | 15 |
| | Methyl methacrylate | 25 | 25 | 39 | 40 |
| | Di-n-butyl fumarate | 10 | 10 | — | — |
| | n-Butyl acrylate | — | — | 15 | 15 |
| | β-Methylglycidyl methacrylate | 15 | 15 | — | — |
| | Glycidyl methacrylate | 15 | 15 | 30 | 30 |
| | Phosphoric monoester of β-hydroxyethyl methacrylate | 0.5 | — | — | — |
| | Phosphoric monoester of β-hydroxypropyl acrylate | — | 1 | 1 | — |
| Vinyl polymer | Softening point (°C.) | 114 | 114 | 112 | 111 |
| | Number average molecular weight | 5300 | 5200 | 5800 | 5800 Z |

TABLE 3

| | Example 8 | Example 9 | Example 10 | Comparative Example 3 |
|---|---|---|---|---|
| Smoothness (surface roughness at a film thickness of 40 microns) | ◎ | ◎ | ○ | Δ |
| Gloss at 60° reflection | 95 | 96 | 92 | 88 |
| Brightness | ◎ | ◎ | ○ | Δ |

The ratings of the smoothness and brightness were the same as in Table 1.

What we claim is:

1. A powder coating resin composition comprising (A) 97 to 70% by weight of a phosphorus-containing vinyl polymer containing a glycidyl group and having a softening point, determined by the ring and ball method, of 70° to 150° C. and a number average molecular weight of 1500 to 30,000, and (B) 3 to 30% by weight of a curing agent, wherein said phosphorus-containing vinyl polymer (A) is the reaction product of (i) a vinyl monomer having at least one curable glycidyl functional group, (ii) a phosphorus-containing vinyl monomer selected from the group consisting of phosphoxy-alkyl methacrylates, phosphoxyalkyl acrylates, dialkyl phosphate alkylmethacrylates, dialkyl phosphate alkylacrylates, dialkyl phosphite alkylmethacrylates, and dialkyl phosphite alkylacrylates; and (iii) another vinyl monomer.

2. A composition according to claim 1 wherein said phosphorus-containing vinyl polymer (A) is a polymer obtained by reacting said vinyl monomer having a glycidyl group (i) with said other vinyl monomer (iii) in the presence of said phosphorus-containing compound (ii).

3. A composition according to claim 1 wherein said phosphorus-containing vinyl polymer (A) is a polymer obtained by reacting said phosphorus-containing compound (ii) with the reaction product of said vinyl monomer having a glycidyl group (i) and said other vinyl monomer (iii).

4. A composition according to claim 1 wherein said phosphorus-containing vinyl polymer (A) is the reaction product of 5 to 50% by weight of the vinyl monomer having a curable functional group (i), 0.001 to 10% by weight of the phosphorus-containing vinyl monomer (ii) and 94.999 to 40% by weight of the other vinyl monomer (iii).

5. A composition according to claim 1 wherein said curing agent (B) is a polycarboxylic acid.

6. A composition according to claim 1 wherein said curing agent (B) is an aliphatic dicarboxylic acid.

7. A composition according to claim 1 which comprises 5 to 20% by weight of the curing agent (B) based on the total amount of the curing agent (B) and the polymer (A).

8. A composition according to claim 4 wherein from 10 to 30% by weight of the vinyl monomer having a glycidyl group (i) is used and from 0.05 to 2% by weight of the phosphorus-containing monomer (ii) is used.

9. A composition according to claim 6 wherein said vinyl monomer (i) is selected from the group consisting of glycidyl methacrylate, glycidyl acrylate, β-methylglycidyl methacrylate and β-methylglycidylacrylate; and said other vinyl monomer (iii) is selected from the group consisting of alkyl methacrylates, alkyl acrylates, dialkyl esters of aliphatic unsaturated dibasic acids, styrene, vinyltoluene, acrylonitrile and vinylacetate.

10. A composition according to claim 9 wherein said phosphorus-containing vinyl monomer is a phosphoric monoester of β-hydroxyethyl methacrylate, β-hydroxyethyl acrylate, β-hydroxypropyl methacrylate or β-hydroxypropyl acrylate.

* * * * *